(12) United States Patent
Chen et al.

(10) Patent No.: US 12,205,237 B2
(45) Date of Patent: Jan. 21, 2025

(54) AUTOMATIC DOLLY ZOOM IMAGE PROCESSING DEVICE

(71) Applicant: MediaTek Inc., Hsinchu (TW)

(72) Inventors: Chih-Wei Chen, Hsinchu (TW);
Pei-Kuei Tsung, Hsinchu (TW);
Yao-Sheng Wang, Hsinchu (TW);
Chun Chen Lin, Hsinchu (TW);
Chia-Ching Lin, Hsinchu (TW);
Hsiao-Chien Chiu, Hsinchu (TW)

(73) Assignee: MediaTek Inc., Hsinchu (TW)

( * ) Notice: Subject to any disclaimer, the term of this patent is extended or adjusted under 35 U.S.C. 154(b) by 369 days.

(21) Appl. No.: 17/722,711

(22) Filed: Apr. 18, 2022

(65) Prior Publication Data

US 2023/0334619 A1 Oct. 19, 2023

(51) Int. Cl.
*G06T 7/194* (2017.01)
*G06T 3/40* (2006.01)
*G06T 7/571* (2017.01)
*H04N 23/69* (2023.01)

(52) U.S. Cl.
CPC ............... *G06T 3/40* (2013.01); *G06T 7/194* (2017.01); *G06T 7/571* (2017.01); *H04N 23/69* (2023.01)

(58) Field of Classification Search
CPC ........... G06T 3/40; G06T 7/194; G06T 7/571; H04N 23/69; H04N 5/2621; H04N 23/61; H04N 23/611
USPC ........................................................ 382/299
See application file for complete search history.

(56) References Cited

U.S. PATENT DOCUMENTS

| 9,025,051 | B2 | 5/2015 | Pylvanainen | |
| 2014/0240553 | A1* | 8/2014 | Pylvanainen | ........ H04N 5/2628 348/240.2 |
| 2023/0316663 | A1* | 10/2023 | Yerli | ..................... G06T 19/006 345/633 |

FOREIGN PATENT DOCUMENTS

| CN | 102592268 B | 4/2015 |
| CN | 107292234 A | 10/2017 |

* cited by examiner

*Primary Examiner* — Huy C Ho
(74) *Attorney, Agent, or Firm* — Tong J. Lee

(57) ABSTRACT

A device produces a dolly zoom effect with automatic focal length adjustment. The device uses a camera to capture an initial image including at least a foreground object and a background. The device includes a size tracking circuit to identify the size of the foreground object in the initial image. The device further includes a focal length control circuit. The focal length control circuit calculates an adjusted focal length of the camera to maintain the size of the foreground object in subsequently captured images.

20 Claims, 6 Drawing Sheets

AUTOMATIC DOLLY ZOOM IMAGE PROCESSING DEVICE

TECHNICAL FIELD

Embodiments of the invention relate to an image processing device that produces an automatic dolly zoom effect.

BACKGROUND

Dolly zoom is a technique in photography and filming for producing an effect of perspective distortion. During a dolly zoom process, the camera dollies (i.e., moves) forward or backward while the photographed subjects stay in place. As the camera dollies to change the shooting position, the zoom lens of the camera changes its field of view (FOV) to keep a foreground object the same size in the image sequence. The FOV changes when the camera zooms in or out. During the zoom process, the background appears to change size relative to the foreground object.

A camera can produce the dolly zoom effect by "dolly-in and zoom-out" or "dolly-out and zoom-in." When a camera dollies in and zooms out, the size of the subject remains unchanged in the captured image and the background is zoomed out. When a camera dollies out and zooms in, the size of the subject remains unchanged in the captured image and the background is zoomed in. Normally, producing the dolly zoom effect requires sophisticated equipment and expertise in photography. It is a challenge for an amateur to coordinate the dolly and zoom operations of a camera.

SUMMARY

In one embodiment, a method is provided for producing a dolly zoom effect. The method comprises capturing, with a camera, an initial image including at least a foreground object and a background. The method further comprises identifying a size of the foreground object in the initial image. The method further comprises calculating and adjusting a focal length of the camera to maintain the size of the foreground object in subsequently captured images.

In another embodiment, a device is provided to produce a dolly zoom effect. The device comprises an image capture circuit, which further includes a camera to capture an initial image. The initial image includes at least a foreground object and a background. The device further includes a size tracking circuit to identify a size of the foreground object in the initial image. The device further includes a focal length control circuit to calculate an adjusted focal length of the camera to maintain the size of the foreground object in subsequently captured images.

In yet another embodiment, a system is provided to produce a dolly zoom effect. The system comprises a camera to capture an initial image that includes at least a foreground object and a background. The system further comprises processing hardware and a memory to store instructions. When executed by the processing hardware, the instructions cause the system to identify a size of the foreground object in the initial image, and calculate and adjust a focal length of the camera to maintain the size of the foreground object in subsequently captured images.

Other aspects and features will become apparent to those ordinarily skilled in the art upon review of the following description of specific embodiments in conjunction with the accompanying figures.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one. Further, when a particular feature, structure, or characteristic is described in connection with an embodiment, it is submitted that it is within the knowledge of one skilled in the art to effect such feature, structure, or characteristic in connection with other embodiments whether or not explicitly described.

DETAILED DESCRIPTION

In the following description, numerous specific details are set forth. However, it is understood that embodiments of the invention may be practiced without these specific details. In other instances, well-known circuits, structures, and techniques have not been shown in detail in order not to obscure the understanding of this description. It will be appreciated, however, by one skilled in the art, that the invention may be practiced without such specific details. Those of ordinary skill in the art, with the included descriptions, will be able to implement appropriate functionality without undue experimentation.

Embodiments of the invention provide a method, device, system, and computer product that can automatically produce a dolly zoom effect in an image sequence captured by a camera while the camera is moving towards or away from a target object (also referred to as a foreground object). The camera has a focal length that is automatically adjusted to keep the target object at the same size in the image sequence. Thus, no manual zooming by the user is needed to produce the dolly zoom effect in the image sequence. The user may identify the target object in an initial image and start moving the camera towards or away from the target object. The user may use the camera to capture a sequence of images at a sequence of locations that are progressively closer or farther away from the target object. Alternatively, the camera may capture a sequence of images at predetermined time intervals (e.g., every 0.1 seconds for M shots) while moving towards or away from the target object. The target object stays at the same size and the same position in the image sequence without the need for manual adjustment of the camera's focal length.

Figure 1:
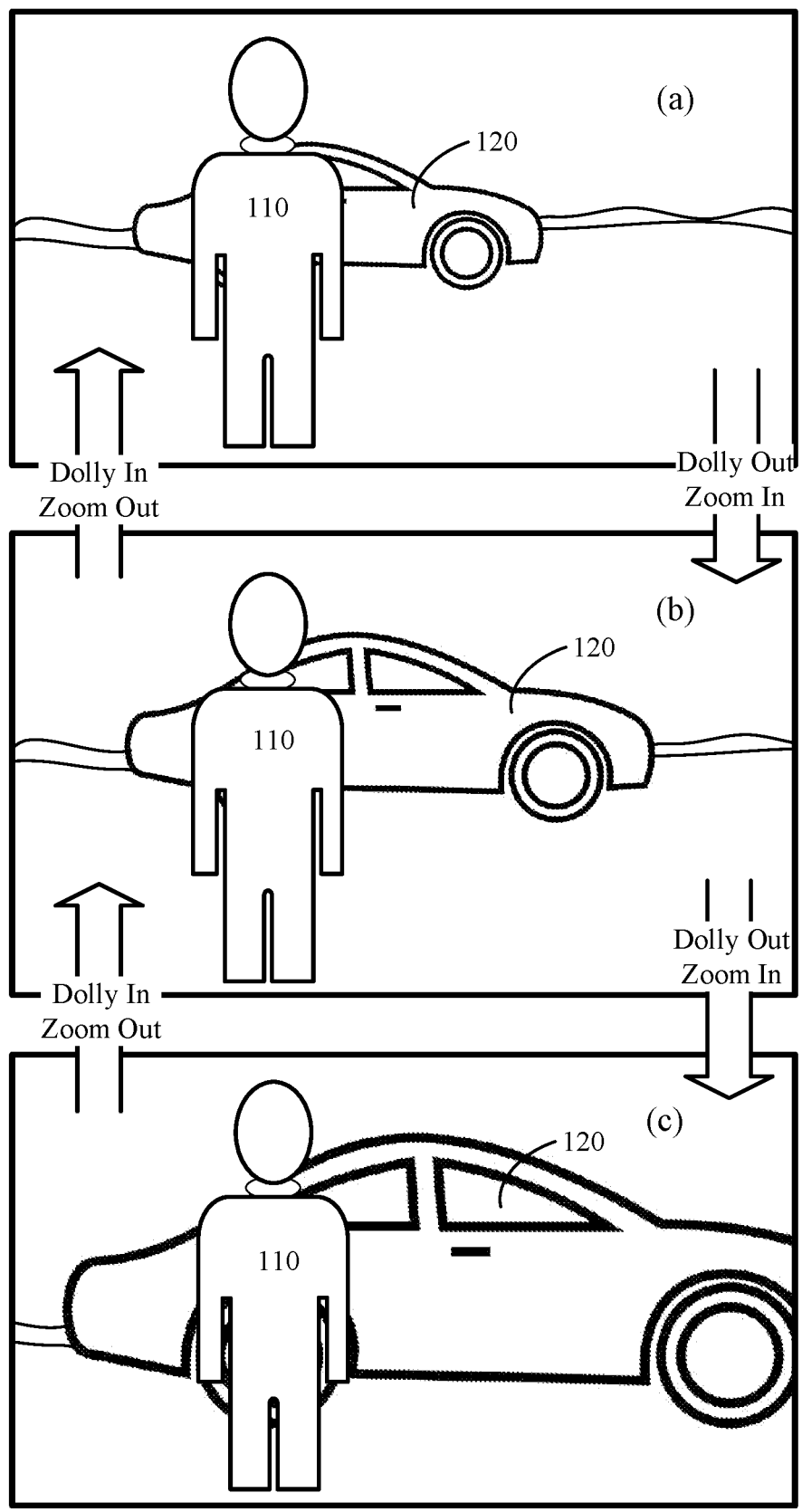
FIG. 1 illustrates an example of a dolly zoom effect according to one embodiment.

FIG. 1 illustrates an example of a dolly zoom effect in an image sequence. The sequence of images (a), (b), (c) illustrates the effect of dolly-out and zoom-in; that is, moving the camera away from a target object 110 while zooming in on the target object 110. When the camera dollies out and zooms in, the focal length of the camera becomes longer and less of the background can be seen. By contrast, the sequence of images (c), (b), (a) illustrates the effect of dolly-in and zoom-out; that is, moving the camera towards the target object 110 while zooming out on the target object 110. When the camera dollies in and zooms out, the focal length of the camera becomes shorter and more of the background can be seen. The target object 110 maintains the same size in all three images in contrast to a background object 120 (e.g., a car), which becomes larger when the camera zooms in (from (a) to (c)) and becomes smaller when the camera zooms out (from (c) to (a)).

Figure 2A:
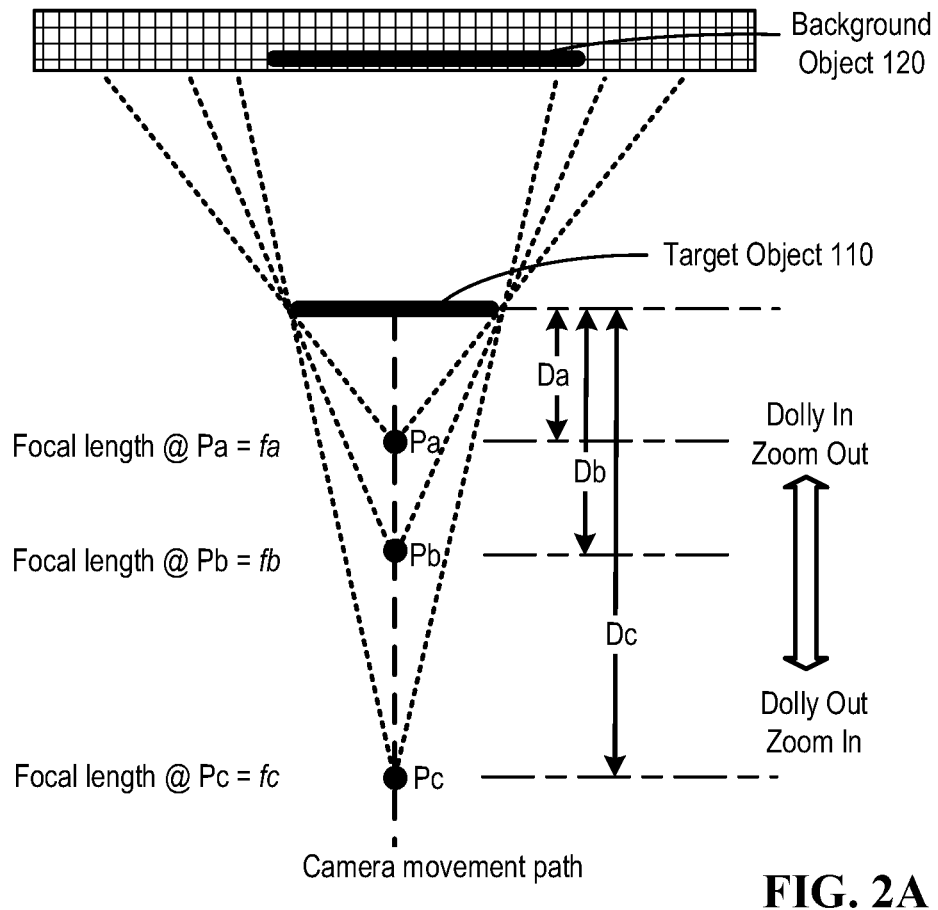
FIG. 2A illustrates a geometric relationship between camera positions and a target object according to one embodiment.

FIG. 2A illustrates a geometric relationship between camera positions and the target object 110 according to one embodiment. The camera positions Pa, Pb, and Pc correspond to the images (a), (b), and (c) in FIG. 1, respectively. The distances from the camera positions Pa, Pb, and Pc to the target object 110 are Da, Db, and Dc, respectively. To keep the target object 110 at the same size in the image sequence, the focal length of the camera is automatically adjusted from fa to fb and to fc when the camera moves from Pa to Pb and then to Pc. When the camera moves from Pc to Pb and then to Pa, its focal length is automatically adjusted from fc to fb and to fa. The center dash line indicates the path of camera movements.

In the following description, the term "captured image" is to be distinguished from the term "sensed image." The camera has an image sensor that may continuously sense images through the camera's lens when the camera is turned on. A sensed image is an image sensed by the image sensor. When a sensed image is captured and becomes a captured image, the captured image can be stored into memory for display or retrieval.

Figure 2B:
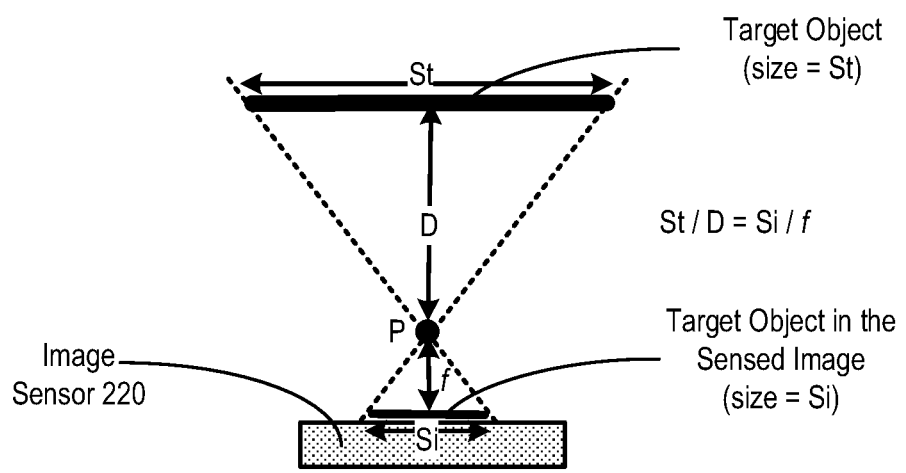
FIG. 2B illustrates a geometric relationship between an actual size and a sensed size of a target object according to one embodiment.

In one embodiment, the camera is part of a device that can keep track of the size of an object of interest (e.g., the target object 110) in a sensed image. FIG. 2B illustrates a geometric relationship between the actual target object and a sensed image of the target object according to one embodiment. The geometric relationship may be described by the formula St/D=Si/f, where St is the size of the target object ("actual object size"), Si is the size of the target object in the image sensed by the camera's image sensor 220 ("sensed object size"), D is the distance from the camera to the target object, and f is the focal length. When the camera moves towards the target object (i.e., D becomes smaller) with the focal length unchanged, the sensed object size becomes larger. Conversely, when the camera moves away from the target object with the focal length unchanged, the sensed object size becomes smaller. To maintain the sensed object size, the camera's focal length changes according to the formula St/D=Si/f. The size may be a measurement of height, width, diagonal, etc. The actual object size St does not change. Thus, to maintain the sensed object size Si, the device is to change the focal length f proportionally to the change in distance D. In one embodiment, the device includes a depth-sensing camera to measure a depth map, from which the distance to the target object can be estimated. In another embodiment, instead of using a depth map, the device detects the change in the sensed object size (e.g., from Si to Si') after a camera movement, and changes the focal length (from f to f') to restore the sensed object size back to Si. For example, if the distance D increases N times to N·D, the sensed object size becomes Si'=Si/N. Upon detecting the change in the sensed size, the device automatically adjusts the focal length of the camera to N·f to restore the sensed object size back to Si and then captures a next image.

Figure 3:
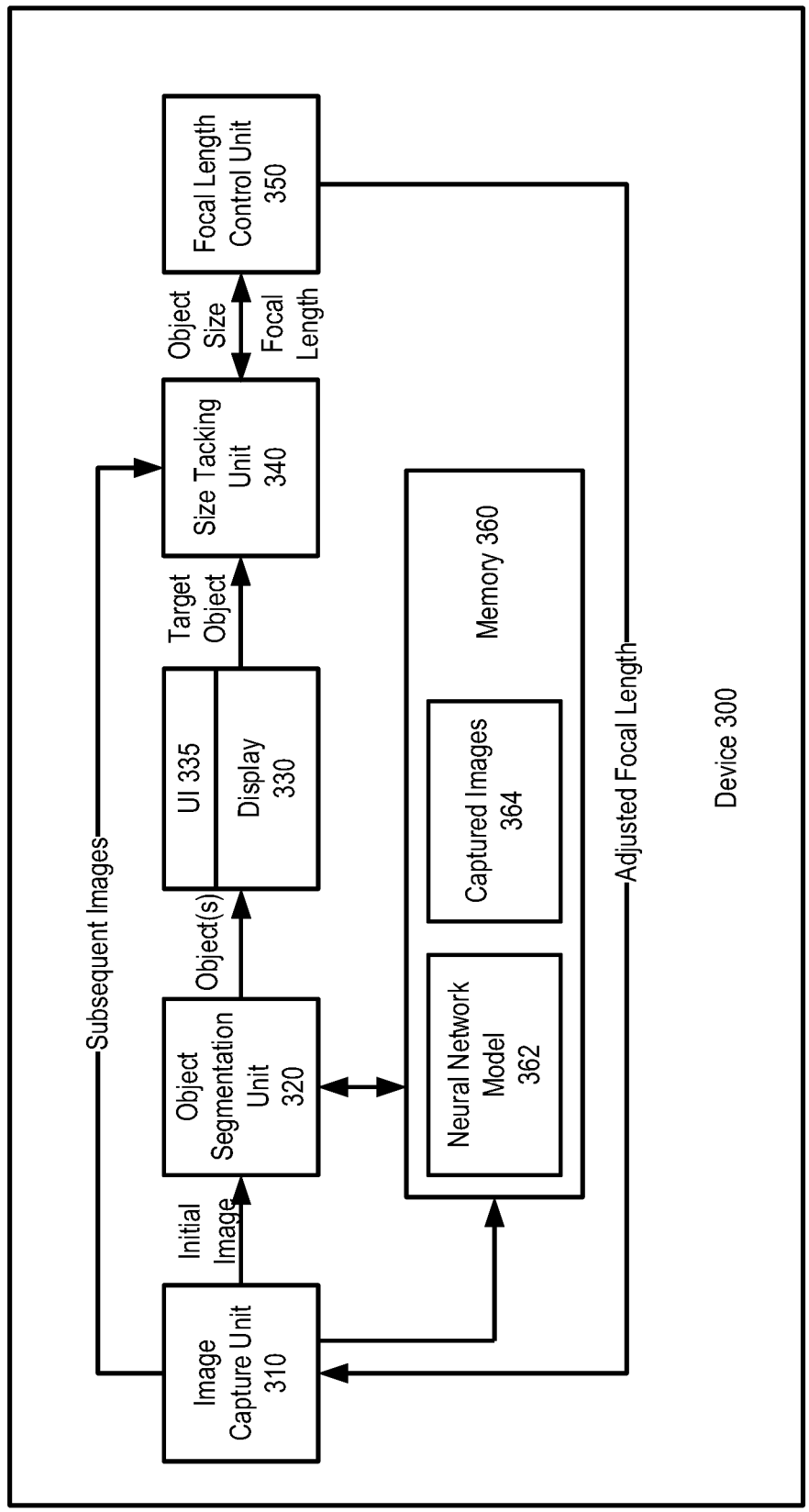
FIG. 3 is a diagram of a device operative to produce an automatic dolly zoom effect according to one embodiment.

FIG. 3 is a diagram of a device 300 operative to produce an automatic dolly zoom effect according to one embodiment. The device 300 may be an image processing device or any electronic device that includes a camera. The device 300 includes an image capture unit 310, an object segmentation unit 320, a size tracking unit 340, and a focal length control unit 350, each of which may be implemented by dedicated circuits or general-purpose circuits that operate under the control of one or more processors and instructions executed by the processors. Thus, in one embodiment, the image capture unit 310, the object segmentation unit 320, the size tracking unit 340, and the focal length control unit 350 are also referred to as the image capture circuit, the object segmentation circuit, the size tracking circuit, and the focal length control circuit, respectively. The device 300 also includes a display 330 for displaying the captured images, and a user interface (UI) 335 for interacting with the user regarding the selection of a target object in a captured image. As an example, the UI 335 may include touch sensors that overlay the display 330 to receive user input. Additionally and/or alternatively, the UI 335 may include a button, a touchpad, or other means for receiving user input.

The image capture unit 310 includes a camera for capturing images. Initially, the image capture unit 310 captures an initial image for target object identification and sizing. The object segmentation unit 320 is operative to locate objects and object boundaries in the initial image. In one embodiment, the object segmentation unit 320 may operate according to a neural network model 362 that has been trained on a large set of training images for object segmentation. The training images may include images of common objects or objects in the past images captured by the user or by the device 300. Non-limiting examples of the neural network model 362 include a convolutional neural network (CNN), a recurrent neural network (RNN), an attention-based neural network, and their variants. The neural network model 362 may be stored in a memory 360 of the device 300.

In one embodiment, the segmentation results may be presented to a user on the display 330. For example, the display 330 may mark each object with a bounding box in the initial image. The user can select an object via the UI 335 as the target object. In another embodiment, the object segmentation unit 320 may automatically select one or more objects of interest and present them to the user for confirmation or further selection of a target object. The object segmentation unit 320 may base the selection on prior knowledge such as photos taken by the user in the past.

The size tracking unit 340 identifies the size of the target object in the initial image. The size may include one or more of the following: height, width, diagonal length, circumference, and the like. In one embodiment, the size may be the sensed object size of the target object; that is, the sensed object size (Si) mentioned previously in connection with FIG. 2B. The sensed object size (Si) is directly proportional to the target object size seen by the user on the display 330. The size tracking unit 340 keeps track of the target object size (e.g., Si) during the dolly zoom process.

The focal length control unit 350 calculates the focal length to maintain the target object size in the images taken during the dolly zoom process. In one embodiment, the focal length may be calculated based on the change in the sensed object size (Si) as mentioned previously in connection with FIG. 2B. The focal length control unit 350 may calculate the focal length using a different formula or method known in the field of photography. The calculated focal length is sent back to the image capture unit 310 to adjust the focal length of the camera.

During the dolly zoom process, subsequent images captured by the image capture unit 310 may bypass the object segmentation unit 320. The object tracking unit 340 keeps track of the sensed object size on the image sensor and interacts with the focal length control unit 350, such that the focal length is adjusted to keep the sensed object size the same. The sequence of images 360 taken by the image capture unit 310 may be stored in the memory 360.

Figure 4:
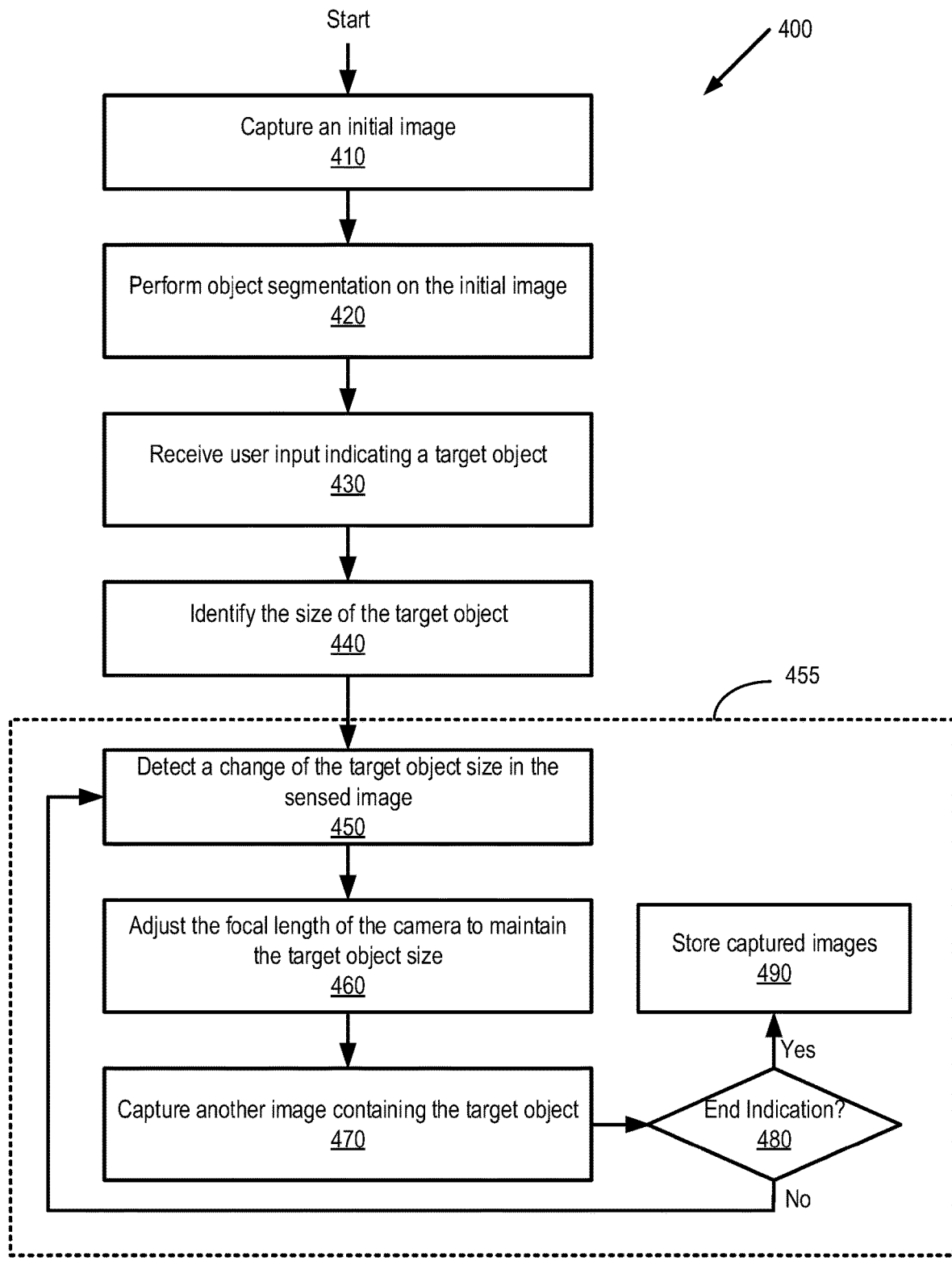
FIG. 4 is a flow diagram illustrating a dolly zoom process according to one embodiment.

FIG. 4 is a flow diagram illustrating a dolly zoom process 400 according to one embodiment. Process 400 may be performed by the device 300 in FIG. 3, a system 600 in FIG. 6, or another electronic device having image capturing and processing capabilities. Process 400 starts when a user starts to capture an image sequence with a device. The device may receive an indication from the user input that the image sequence is to be captured with a dolly zoom effect. The device may capture the images at predetermined or configurable time intervals; e.g., k milliseconds per image, until an end signal from the user. Alternatively, the device may capture the images when prompted by the user at each of a series of photo-shooting locations. The user may move the device at any pace towards or away from a target object during the process 400.

Process 400 includes initial steps 410-440 in which the device captures an initial image at step 410, performs object segmentation at step 420, receives user input indicating a target object at step 430, and identifies the size of the target object at step 440. Once the target object size is identified, process 400 proceeds to the iterative steps illustrated in the dotted area 455. At step 450, the device detects a change of the target object size in the sensed image. The change of the target object size in the sensed image may be an indication of camera movement. The device adjusts the focal length of the camera to maintain the target object size at step 460, and captures another image with the adjusted focal length at step 470. If at step 450 there is no change to the target object size in the sensed image, the focal length stays the same at step 460. Steps 450-470 may be repeated until an end indication is received at step 480; e.g., an end signal from the user or a predetermined time period has elapsed. The device stores the captured images in a memory at step 490.

Figure 5:
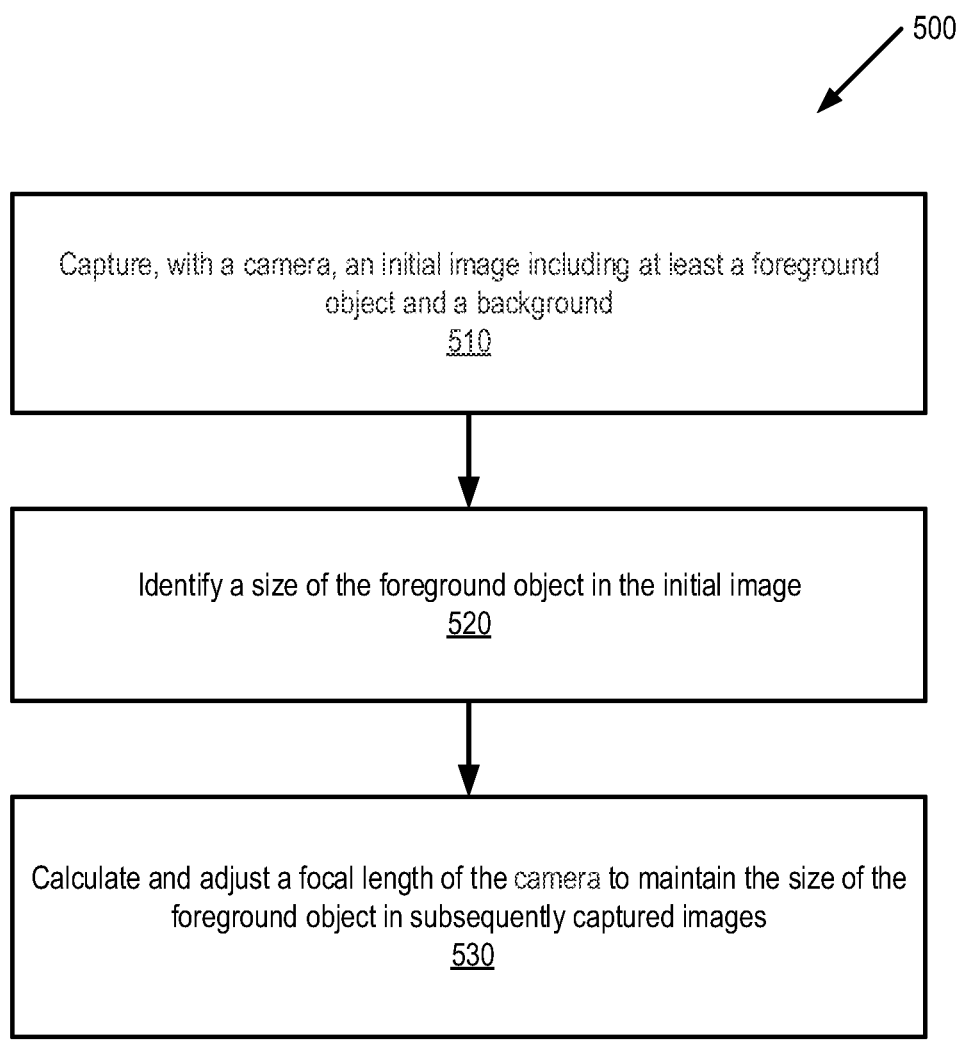
FIG. 5 is a flow diagram illustrating a method for automatic dolly zoom image processing according to one embodiment.

FIG. 5 is a flow diagram illustrating a method 500 for automatic dolly zoom image processing according to one embodiment. Method 500 may be performed by the device 300 in FIG. 3, a system 600 in FIG. 6, or another electronic device having image capturing and processing capabilities.

Method 500 begins at step 510 when the device uses a camera to capture an initial image including at least a foreground object and a background. The foreground object is also referred to as a target object. At step 520, the device identifies the size of the foreground object in the initial image. At step 530, the device calculates and adjusts the focal length of the camera to maintain the size of the foreground object in subsequently captured images.

In one embodiment, steps 520 and 530 are repeated until an end indication is received. The device then generates an image sequence with the foreground object kept at the same size and the same position in each image frame of the image sequence. The size may include height, width, or both height and width. In one embodiment, the subsequently captured images are captured at predetermined time intervals. At each time interval, the device calculates a change of the foreground object size in an image sensed by the camera, determines an adjusted focal length according to the change, and captures a subsequent image with the adjusted focal length. In another embodiment, the device calculates a change of the foreground object size in an image sensed by the camera when the camera moves to a next location. The device determines an adjusted focal length according to the change, and captures a subsequent image at the next location.

Figure 6:
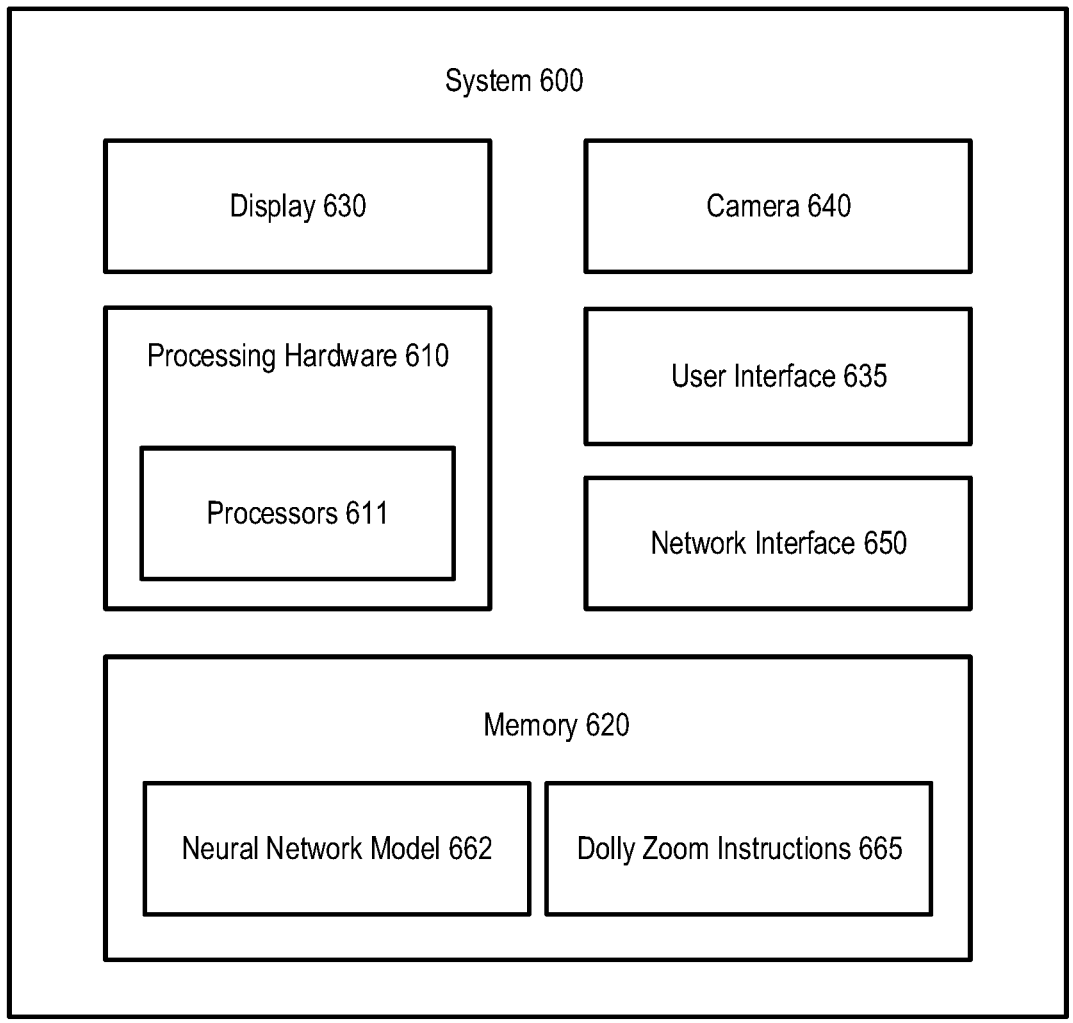
FIG. 6 is a block diagram illustrating a system operative to perform automatic dolly zoom image processing according to one embodiment.

FIG. 6 is a block diagram illustrating a system 600 operative to perform automatic dolly zoom image processing according to one embodiment. The system 600 includes hardware and software for executing the operations described in connection with FIGS. 4 and 5. The system 600 includes processing hardware 610 which further includes one or more processors 611 such as central processing units (CPUs), graphics processing units (GPUs), digital processing units (DSPs), neural processing units (NPUs), field-programmable gate arrays (FPGAs), application-specific integrated circuits (ASICs), and other general-purpose processors and/or special-purpose processors. The NPU may perform tensor operations; e.g., object segmentation, according to a neural network model 662 stored in a memory 620. Examples of the tensor operations include, but are not limited to: convolution, deconvolution, fully-connected operations, normalization, activation, pooling, resizing, element-wise arithmetic, concatenation, slicing, etc.

The system 600 further includes a memory 620 coupled to the processing hardware 610. The memory 620 may include dynamic random access memory (DRAM), SRAM, flash memory, and other non-transitory machine-readable storage medium; e.g., volatile or non-volatile memory devices. The memory 620 may further include storage devices, for example, any type of solid-state or magnetic storage device. In one embodiment, the memory 620 may store instructions which, when executed by the processing hardware 610, cause the processing hardware 610 to perform the aforementioned automatic dolly zoom operations, such as the method 400 in FIG. 4 and the method 500 in FIG. 5. In one embodiment, the memory 620 may store dolly zoom instructions 665 for the processing hardware 610 to execute the operations of one or more of object segmentation, target object size tracking, focal length calculation and adjustment, etc.

The system 600 also includes a display 630 and a camera 640 (also referred to as an image capture unit). The system 600 may also include a user interface 635 to interact with the users. In some embodiments, the system 600 may also include a network interface 650 to connect to a wired and/or wireless network for transmitting and/or receiving signals such as image data. It is understood the embodiment of FIG. 6 is simplified for illustration purposes. Additional hardware components may be included.

Various functional components, blocks, or units have been described herein. As will be appreciated by persons skilled in the art, the functional blocks will preferably be implemented through circuits (either dedicated circuits or general-purpose circuits, which operate under the control of one or more processors and coded instructions), which will typically comprise transistors that are configured in such a way as to control the operation of the circuitry in accordance with the functions and operations described herein.

The operations of the flow diagrams of FIGS. 4 and 5 have been described with reference to the exemplary embodiments of FIGS. 3 and 6. However, it should be understood that the operations of the flow diagrams of FIGS. 4 and 5 can be performed by embodiments of the invention other than the embodiments of FIGS. 3 and 6, and the embodiments of FIGS. 3 and 6 can perform operations different than those discussed with reference to the flow diagrams. While the flow diagrams of FIGS. 4 and 5 show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, and can be practiced with modification and alteration within the spirit and scope of the appended claims. The description is thus to be regarded as illustrative instead of limiting.

What is claimed is:

1. A method performed by a device for producing a dolly zoom effect, comprising:
   capturing, with a camera on the device, an initial image including at least a foreground object and a background;
   identifying a size of the foreground object in the initial image; and
   calculating and automatically adjusting a focal length of the camera to maintain the size of the foreground object in subsequent images,
   wherein for each of the subsequent images, the method further comprises:
   calculating a change of foreground object size in a sensed image that is sensed by an image sensor of the camera;
   automatically determining an adjusted focal length according to the change; and
   capturing the sensed image as the subsequent image with the adjusted focal length.

2. The method of claim 1, wherein the size of the foreground object is defined by one of height and width.

3. The method of claim 1, wherein the subsequent images are captured at predetermined time intervals.

4. The method of claim 1, wherein calculating and automatically adjusting further comprises:
   calculating the change of the foreground object size in the sensed image when the camera moves to a next location;
   automatically determining the adjusted focal length according to the change; and
   capturing the sensed image as the subsequent image with the adjusted focal length at the next location.

5. The method of claim 1, further comprising:
   repeating the identifying, the calculating, and the adjusting until receiving an end indication; and
   generating an image sequence with the foreground object kept at the same size throughout the image sequence and the background zoomed in or out.

6. The method of claim 5, wherein the foreground object stays at the same size and the same position in each image frame of the image sequence.

7. The method of claim 5, further comprising:
   receiving an indication from a user input that the image sequence is to be captured with the dolly zoom effect.

8. The method of claim 1, further comprising:
   segmenting objects in the initial image; and
   identifying the foreground object from one of the segmented objects.

9. The method of claim 1, further comprising:
   segmenting objects in the initial image; and
   displaying the segmented objects on a display to receive a user input that selects one of the segmented objects as the foreground object.

10. The method of claim 1, further comprising:
    segmenting objects in the initial image according to a trained neural network model.

11. A device operative to produce a dolly zoom effect, comprising:
    an image capture circuit including a camera operative to capture an initial image including at least a foreground object and a background;
    a size tracking circuit operative to identify a size of the foreground object in the initial image; and
    a focal length control circuit operative to calculate an adjusted focal length of the camera to maintain the size of the foreground object in subsequent images,
    wherein for each of the subsequent images:
    the size tracking circuit is further operative to calculate a change of the foreground object size in a sensed image that is sensed by an image sensor of the camera;
    the focal length control circuit is further operative to determine the adjusted focal length according to the change; and
    the image capture circuit is further operative to capture the sensed image as the subsequent image with the adjusted focal length.

12. The device of claim 11, further comprising:
    an object segmentation circuit operative to segment objects in the initial image for identifying the foreground object.

13. The device of claim 12, further comprising:
    a memory to store a trained neural network model, according to which the object segmentation circuit segments the objects in the initial image.

14. The device of claim 12, further comprising:
    a display to display one or more of the segmented objects; and
    a user interface to receive a user input that identifies the foreground object.

15. The device of claim 11, wherein the size of the foreground object is defined by one of height and width.

16. The device of claim 11, wherein the image capturing circuit captures the subsequent images at predetermined time intervals.

17. The device of claim 11, wherein the object tracking circuit is further operative to calculate the change of the foreground object size in the sensed image when the camera moves to a next location.

18. The device of claim 17, wherein the focal length control circuit is further operative to determine the adjusted focal length according to the change to cause the image capture circuit to capture the subsequent image at the next location.

19. A system operative to produce a dolly zoom effect, comprising:
    a camera to capture an initial image including at least a foreground object and a background;
    processing hardware; and
    a memory to store instructions, which when executed by the processing hardware, cause the system to:
    identify a size of the foreground object in the initial image; and
    calculate and adjust a focal length of the camera to maintain the size of the foreground object in subsequent images,
    wherein for each of the subsequent images, the system is further operative to:
    calculate a change of foreground object size in a sensed image that is sensed by an image sensor of the camera;
    automatically determine an adjusted focal length according to the change; and
    capture the sensed image as the subsequent image with the adjusted focal length.

20. The system of claim 19, wherein the camera captures the subsequent images at predetermined time intervals.

\* \* \* \* \*